Aug. 9, 1949.                G. J. LANGE                 2,478,766
                    TOOLHOLDER FOR MAGNETIC CHUCKS
                         Filed Feb. 4, 1948

INVENTOR.
Gustave J. Lange
BY Victor J. Evans & Co.
ATTORNEYS

Patented Aug. 9, 1949

2,478,766

UNITED STATES PATENT OFFICE 2,478,766

TOOLHOLDER FOR MAGNETIC CHUCKS

Gustave J. Lange, Elgin, Ill.

Application February 4, 1948, Serial No. 6,167

3 Claims. (Cl. 51—218)

1

This invention relates to a tool holder adapted to be connected to a magnetic chuck.

It is an object of the present invention to provide a tool holder adapted to retain tools to be ground at an angle and wherein the exact angle of grinding must be closely approximated in order that the best work can be accomplished.

Other objects of the present invention are to provide a tool holder for magnetic chucks which is adjustable to effect an angular grinding face on the tool which is of simple construction, inexpensive to manufacture and efficient in operation.

For other objects and for a better understanding of the invention, reference may be had to the following detailed description taken in connection with the accompanying drawing, in which Fig. 1 is a top plan view of the tool holder.

Figure 1:
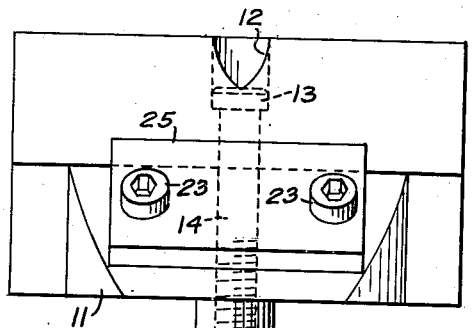
Figure 2:
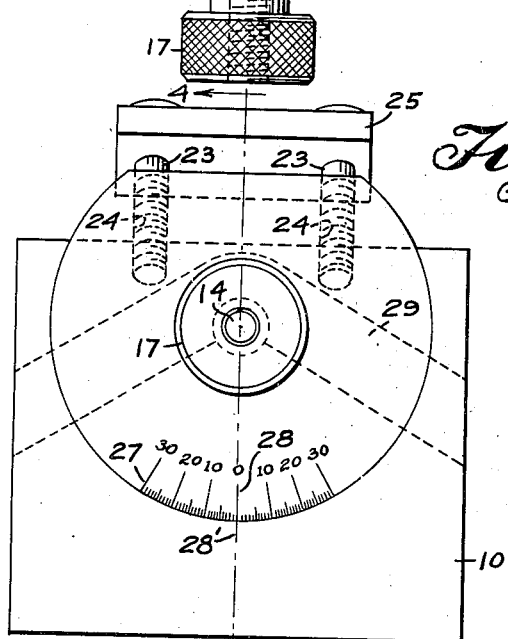
Fig. 2 is a side elevational view of the tool holder.
Figure 3:
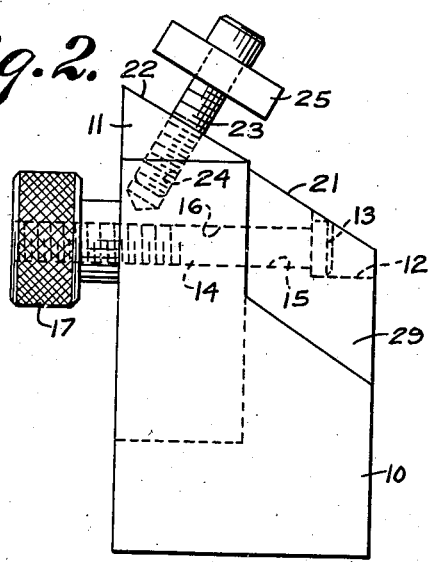
Fig. 3 is an end elevational view of the tool holder.
Figure 4:
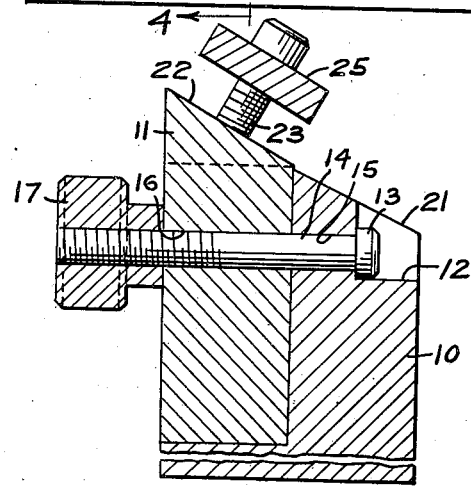
Fig. 4 is a sectional view, in elevation, taken on line 4—4 of Fig. 2.

Referring now to the figures, 10 represents a base of metal adapted to be solidly attached to a magnetic chuck by the engagement of one of its faces therewith. In the front of the holder or base is a recess adapted to receive a rotatable member 11. This recess has a round wall face and the rotatable member is supported therein for angular adjustment. In the rear of the base 10 is a recess 12 in which lies a head 13 of a bolt 14 which is extended through an opening 15 of the base 10 and through a hole 16 of the rotatable member 11. On the forward end of the bolt 14 there is threaded a knob 17 which can be brought against the front face of the rotary member 11 to hold the same after it has been adjusted in tight flush engagement with the back of the recess in which the rotatable member 11 fits. The top of the base is inclined as at 21. The top of the rotary member 11 also has an inclined face as shown at 22. Projecting outwardly from this inclined face and normal thereto are threaded projections 23, two in number. These threaded projections are in the form of screws which can be extended into screw holes 24 extending through the top inclined face of the rotary member 11. These screws are of the Allen head type and the heads thereof will rest against a clamping plate 25 which is extended over the tool and when brought into clamping relationship with the tool will secure the same tightly against the inclined face 22 of the rotary member 11.

It will be noted that the rotary member has graduations 27 indicating angles from zero up to thirty and at opposite sides of a zero point 28. On the face of the base 10 is an index mark 28 with reference to which the angle indication is taken. With the tool in place beneath the clamping plate 25, the adjustment of the rotary member can be made so that the surface of the tool to be ground will be presented at the proper angle to the grinding element of the machine effecting the grinding operation.

The outer edges of the base 10, at the top thereof, are cut away as indicated at 29 to permit the angular adjustment of the rotary member 11 with the tool connected thereto.

While various changes may be made in the detail construction, it shall be understood that such changes shall be within the spirit and scope of the present invention as defined by the appended claims.

I claim:

1. A tool holder adapted for connection to a magnetic chuck comprising a base having flat faces for the engagement of the same with the chuck, said base being cut away at its front face to provide for a circular recess, a round rotary member adapted to fit the recess and be angularly adjusted therein, a pivot pin extending from the base through the rotary member on which the rotary member is adjustable, a clamping nut on the pivot pin for retaining the rotary member in its adjusted position, and means on the top of the rotary member for securement thereto of a tool to be ground, said rotary member having a downwardly and rearwardly inclined top face, said clamping means comprising threaded members extending outwardly and in a normal direction from said inclined face on the top of the rotary member, a clamping plate extending between the threaded projections.

2. A tool holder as defined in claim 1 and said base member having its top downwardly and rearwardly inclined from the rear of the inclined face of the rotary member, said upper portion of the base having side portions cut away whereby to allow for the angular adjustment of the rotary member and the tool as the rotary member is adjusted therewith on the base, whereby the base will be free of interferring portions.

3. A tool holder as defined in claim 1 and said base having a recess, said pivot pin being in the form of a bolt having a head portion thereon and said head portion lying in the recess of the base, said means for fixing the rotary member in its adjusted position comprising a knob fixed to the threaded end of the bolt.

GUSTAVE J. LANGE.

REFERENCES CITED

The following references are of record in the file of this patent:

UNITED STATES PATENTS

| Number | Name | Date |
| --- | --- | --- |
| 2,379,520 | Hartung | July 3, 1945 |